United States Patent
Ramamurthy et al.

(10) Patent No.: US 10,915,570 B2
(45) Date of Patent: Feb. 9, 2021

(54) PERSONALIZED MEETING SUMMARIES

(71) Applicant: SRI International, Menlo Park, CA (US)

(72) Inventors: Bhaskar Ramamurthy, Los Altos, CA (US); Rajan Singh, Sunnyvale, CA (US); Dimitra Vergyri, Sunnyvale, CA (US); Jagjit Singh Srawan, Cupertino, CA (US); Rolf Joseph Rando, San Francisco, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 16/365,439

(22) Filed: Mar. 26, 2019

(65) Prior Publication Data
US 2020/0311122 A1 Oct. 1, 2020

(51) Int. Cl.
*H04L 29/06* (2006.01)
*G06F 16/483* (2019.01)
(Continued)

(52) U.S. Cl.
CPC ........ *G06F 16/483* (2019.01); *G06F 16/3326* (2019.01); *G06F 16/433* (2019.01);
(Continued)

(58) Field of Classification Search
CPC .. G06F 16/483; G06F 16/4393; G06F 16/433; G06F 16/3326; G06N 20/20; G06N 3/08
(Continued)

(56) References Cited

U.S. PATENT DOCUMENTS

| | | | | |
|---|---|---|---|---|
| 6,119,147 A | * | 9/2000 | Toomey | G06Q 10/109 709/204 |
| 10,645,035 B2 | * | 5/2020 | Nowak-Przygodzki | H04L 12/1831 |

(Continued)

FOREIGN PATENT DOCUMENTS

| | | |
|---|---|---|
| EP | 2665023 A1 | 11/2013 |
| WO | 2017/184204 A1 | 10/2017 |

OTHER PUBLICATIONS

"The Stanford Parser: A Statistical Parser," retrieved from https://nlp.stanford.edu/software/lex-parser, Apr. 10, 2019, 15 pp.
(Continued)

*Primary Examiner* — Hassan Mrabi
(74) *Attorney, Agent, or Firm* — Shumaker & Sieffert. P.A

(57) ABSTRACT

In general, the disclosure describes techniques for personalizing a meeting summary according to the relevance of different meeting items within a meeting to different users. In some examples, a computing system for automatically providing personalized summaries of meetings comprises a memory configured to store information describing a meeting; and processing circuitry configured to receive a plurality of meeting item summaries of respective meeting items included in the transcript of the meeting; determine, by applying a model of meeting item relevance to the meeting item summaries, a corresponding relevance to a user of each of the meeting item summaries; and output respective indications of relevance to the user for one or more of the meeting item summaries to provide a personalized summary of the meeting to the user.

20 Claims, 8 Drawing Sheets

(51) Int. Cl.
  *G06F 16/438* (2019.01)
  *G06F 16/432* (2019.01)
  *G06N 20/20* (2019.01)
  *G06N 3/08* (2006.01)
  *G06F 16/332* (2019.01)

(52) U.S. Cl.
  CPC .......... *G06F 16/4393* (2019.01); *G06N 3/08* (2013.01); *G06N 20/20* (2019.01)

(58) Field of Classification Search
  USPC ........................................................ 715/202
  See application file for complete search history.

(56) References Cited

U.S. PATENT DOCUMENTS

| | | | |
|---|---|---|---|
| 2004/0114541 A1* | 6/2004 | Caspi | H04M 3/567 370/260 |
| 2004/0230655 A1* | 11/2004 | Li | G06F 16/4393 709/205 |
| 2004/0246331 A1* | 12/2004 | Caspi | H04M 3/567 348/14.08 |
| 2005/0021334 A1 | 1/2005 | Iwahashi | |
| 2012/0166921 A1 | 6/2012 | Alexandrov | |
| 2012/0290289 A1 | 11/2012 | Manera | |
| 2013/0191452 A1* | 7/2013 | Beerse | H04L 65/403 709/204 |
| 2013/0325972 A1* | 12/2013 | Boston | G06K 9/00751 709/206 |
| 2015/0348538 A1* | 12/2015 | Donaldson | G10L 17/22 704/235 |
| 2016/0027442 A1* | 1/2016 | Burton | G10L 15/26 704/235 |
| 2018/0077099 A1* | 3/2018 | Silva | H04L 51/16 |
| 2018/0122383 A1* | 5/2018 | Raanani | H04M 3/5175 |
| 2018/0137402 A1* | 5/2018 | Bar | G06N 3/006 |
| 2018/0213013 A1 | 7/2018 | Adams | |
| 2018/0227339 A1 | 8/2018 | Rodriguez | |
| 2018/0331842 A1 | 11/2018 | Faulkner | |
| 2019/0028520 A1* | 1/2019 | Nawrocki | G06N 20/00 |
| 2019/0034767 A1* | 1/2019 | Sainani | G06K 9/00979 |
| 2019/0108834 A1 | 4/2019 | Nelson | |
| 2019/0130917 A1 | 5/2019 | Pogorelik | |
| 2019/0132265 A1* | 5/2019 | Nowak-Przygodzki | H04L 51/02 |
| 2019/0147367 A1* | 5/2019 | Bellamy | G06N 3/006 706/12 |
| 2019/0171760 A1 | 6/2019 | Ikeda | |
| 2019/0294999 A1* | 9/2019 | Guttmann | G06K 9/6219 |
| 2019/0295041 A1* | 9/2019 | Sim | G10L 15/02 |
| 2019/0297126 A1* | 9/2019 | Graziano | G06F 16/4393 |
| 2019/0379742 A1 | 12/2019 | Simpkinson | |
| 2019/0384813 A1* | 12/2019 | Mahmoud | G06F 40/289 |
| 2019/0384854 A1* | 12/2019 | Mahmoud | G10L 15/26 |

OTHER PUBLICATIONS

Burger et al., "The ISL Meeting Corpus: The impact of meeting type on speech style." In proceedings of the 7th International Conference on Spoken Language Processing, ICSLP2002, Sep. 2002, 4 pp.

Freitag, "Trained Named Entity Recognition Using Distributional Clusters," Proceedings of the 2004 Conference on Empirical Methods in natural language Processing, (EMNLP), Jul. 2004, 8 pp.

Mihalcea et al., "TextRank: Bringing Order into Texts," retrieved from https://www.aclweb.org/anthology/W04-3252, 2004, 8 pp. (Applicant points out, in accordance with MPEP 609.04(a), that the year of publication, 2004, is sufficiently earlier than the effective U.S. filing date, so that the particular month of publication is not in issue.).

U.S. Appl. No. 16/387,325, filed Apr. 17, 2019, naming inventor John Niekrasz.

U.S. Appl. No. 62/659,963, by John Niekrasz, filed Apr. 19, 2018.

U.S. Appl. No. 62/662,169, by John Niekrasz, filed Apr. 24, 2018.

Chen et al., Sequence Synopsis: Optimize Visual Summary of Temporal Event Data, IEEE Transactions on Visualization and Computer Graphics, vol. 24, Issue 1, pp. 45-55. (Jan. 2018).

\* cited by examiner

|  | ITEM (e.g. Intro) | ITEM (e.g. Agenda) | ITEM (e.g. Summary) |
| --- | --- | --- | --- |
| Participant 1 | ✓ | ✓ | ✓ |
| Participant 2 |  | ✓ |  |
| Participant 3 | ✓ |  | ✓ |
|  |  |  |  |

| | Common information | | Machine Learning System 224 | | Rules Engine 228 | | Result of the contentions manager |
|---|---|---|---|---|---|---|---|
| ITEM 1 | Relevant | P1, P2, P3 | Relevant | P1, P2, P3 | Relevant | P1, P2 | ITEM 1 is relevant to P1, P2 and P3 |
| ITEM 2 | Relevant | P1, P2 | Relevant | No Determination | Relevant | No Determination | ITEM 2 is relevant to P1 and P2 |
| ITEM 3 | Relevant | No Determination | Relevant | P1 | Relevant | P2, P3 | ITEM 3 is relevant to P1, P2 and P3 |

| | Common information | | Machine Learning System 224 | | Rules Engine 228 | | Result of the contentions manager |
|---|---|---|---|---|---|---|---|
| ITEM 1 | Relevant | P1, P2, P3 | Relevant | P1, P2, P3 | Relevant | P1, P2 | ITEM 1 is only relevant to P1 and P2 |
| ITEM 2 | Relevant | P1, P2 | Relevant | No Determination | Relevant | No Determination | ITEM 2 is only relevant to P1 and P2 |
| ITEM 3 | Relevant | No Determination | Relevant | P1 | Relevant | P2, P3 | ITEM 3 is only relevant to P2 and P3. |

FIG. 8B

PERSONALIZED MEETING SUMMARIES

TECHNICAL FIELD

This disclosure relates to computing systems and, more specifically, to computing systems for generating personalized meeting summaries.

BACKGROUND

Multiple participants engage with one another by way of a meeting to exchange information, directives, ideas, tasks, and so forth. Using voice recognition technology, computing systems can generate a verbatim (or near-verbatim) transcripts of the words uttered by participants in a meeting, such as by processing an audio recording or live stream of the meeting. As a result, anyone interested in the contents of the meeting can review the transcript, which is typically more readily and quickly comprehensible than the audio recording or live stream of the meeting.

SUMMARY

In general, this disclosure describes techniques for personalizing a meeting summary according to the relevance of different meeting items within a meeting to different users. For example, a computing system may receive a meeting summary of a meeting among one or more participants, where a "meeting" as used herein can also include a spoken dictation by a single participant. The meeting summary may include meeting item summaries that each represents a summary of a meeting item within the meeting. A meeting item may include a set of utterances within the meeting that relate to a single matter, where that matter can include, e.g., an introduction, an agenda, a topic, an action item or task, an explanation, an overall summary, or another type of meeting item.

As described herein, the computing system applies a model of meeting item relevance to the meeting item summaries to identify the corresponding set of relevant meeting item summaries for one or more users. The model of meeting item relevance may include a machine learning model trained on annotated transcript utterances to identify action items in a meeting and, combined with transcript and meta-information from the meeting, use that knowledge to provide a personalized summary of action items to a user. The learning model can be trained based on feedback from co-clustering of words and phrases from a transcript, transcripts and summaries from prior meetings, as well as other meta-data such as title of meeting entered into the system, notes taken by users of the system during and after the meeting, and interaction with meeting items (such as highlighting or deleting a meeting item by clicking an icon). As another example, the model of meeting item relevance may include a set of rules applied by a rules engine of the computing system, where each of the rules may specify, for instance, a relevance to a user of: (1) a type of meeting item summary, (2) content in meeting item summaries, (3) a particular meeting item summary, or (4) the specificity of the meeting item related to a task in order to identify meeting item summaries relevant to a user. Upon identifying the set of relevant meeting item summaries for a user, the computing system may generate a personalized meeting summary for that user that includes, highlights, or otherwise including an indication of the relevance of the set of relevant meeting item summaries. The computing system may generate multiple different personalized meeting summaries, each tailored by relevance to the corresponding user for which the computing system generates the personalized meeting summary.

The techniques of this disclosure involve one or more technical improvements to voice recognition and dictation-related technologies that provide at least one practical application. For example, a computing system as described herein may include a model of meeting item relevance generated using machine learning or by configuration, for instance, to incorporate intelligence regarding user needs and preferences into a summarization system. This may enable the computing system to automatically generate personalized summaries of a meeting, where each personalized summary is tailored to the interest and responsibilities of a user or application for which the personalized summary has been generated. This may have the practical benefit of drawing the attention of the user to specific sections of a meeting that are relevant to that user, yielding an increased efficiency of information transfer. Each personalized summary may include diarized statements identifying speakers for each utterance included as a transcript within a meeting item summary included in the personalized summary.

In some examples, a method for automatically providing personalized summaries of meetings comprises receiving, by a computing system, a plurality of meeting item summaries of respective meeting items of a meeting; determining, by the computing system, by applying a model of meeting item relevance to the meeting item summaries, a corresponding relevance to a user of each of the meeting item summaries; and outputting, by the computing system, respective indications of relevance to the user for one or more of the meeting item summaries to provide a personalized summary of the meeting to the user.

In some examples, a computing system for automatically providing personalized summaries of meetings comprises a memory configured to store information describing a meeting; and processing circuitry configured to receive a plurality of meeting item summaries of respective meeting items included in the transcript of the meeting; determine, by applying a model of meeting item relevance to the meeting item summaries, a corresponding relevance to a user of each of the meeting item summaries; and output respective indications of relevance to the user for one or more of the meeting item summaries to provide a personalized summary of the meeting to the user.

In some examples, a non-transitory computer-readable medium comprises instructions for causing processing circuitry of a computing system to perform operations comprising: receiving a plurality of meeting item summaries of respective meeting items included a meeting; determining, by applying a model of meeting item relevance to the meeting item summaries, a corresponding relevance to a user of each of the meeting item summaries; and outputting respective indications of relevance to the user for one or more of the meeting item summaries to provide a personalized summary of the meeting to the user.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 6 is an example table of contention resolution rules, according to techniques described herein.

FIGS. 8A-8B are tables each depicting example relevancy determinations by different relevancy determination techniques and contention resolution, according to techniques described herein.

Like reference characters refer to like elements throughout the figures and description.

DETAILED DESCRIPTION

Figure 1:
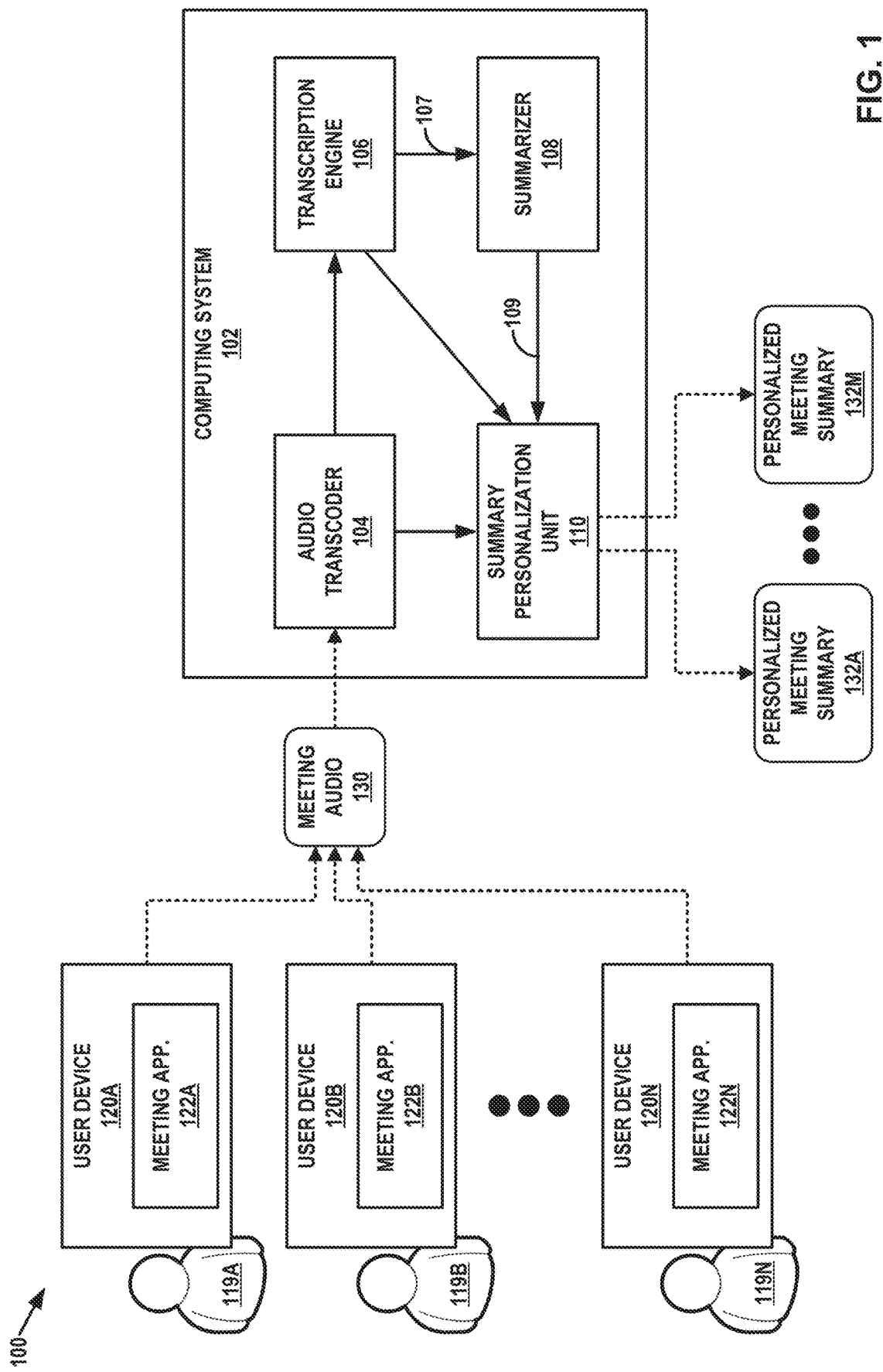
FIG. 1 is a block diagram illustrating an example system for generating personalized meeting summaries, in accordance with techniques of this disclosure.

FIG. 1 is a block diagram illustrating an example system 100 for generating personalized meeting summaries, in accordance with techniques of this disclosure. System 100 includes user devices 120A-120N executing respective meeting applications 122A-122N by which respective users 119A-119N participate in a meeting. Although shown as multiple user devices with multiple users, a meeting may have a single participant. Each of user devices 120 may represent a telephone, a conferencing device, a desktop or laptop computer, a smartphone, a tablet computer, a voice recorder, or other device for generating audio signals from utterances by a user. Each of meeting applications 122 may include a conferencing application, a Voice over Internet Protocol (VoIP) application, a Video over IP application, a video conferencing application, an Internet-based video conference application, or a telephone application. In some cases, a centralized meeting application executed by one or more servers (not shown) receives audio signals (and in some cases other media) from user devices 120 and may distribute the audio signals among user devices 120 for listening by the users 119. The server(s) may be cloud-based.

User devices 120 include input devices to receive utterances from the users and convert the utterances to audio signals. The combination of all audio signals generated by user devices 120 is meeting audio 130. Meeting applications 122 and/or a centralized meeting application may record meeting audio 130 to an audio file for storage and later processing. Meeting applications 122 and/or a centralized meeting application may stream meeting audio 130 to computing system 102. Computing system 102 may execute the centralized meeting application, in some cases, to generate meeting audio 130 from audio signals received from user devices 120.

Computing system 102, in this example, includes an audio transcoder 104, transcription engine 106, summarizer 108, and summary personalization unit 110. Each of these components may include software executed by processing circuitry, hardware, or a combination of software and hardware. Audio transcoder 104 receives audio signals generated by user devices 120, in the form of meeting audio 130, and may convert meeting audio 130 to an appropriate file format for transcription engine 106, which may be executed by a local server, or remote server, such as a cloud-based transcription service. Transcription engine 106 provides speech-to-text conversion on an audio stream or recording of the conversation occurring in a meeting and produces a text transcript 107. Transcription engine 106 may further perform diarization, in which each transcribed utterance is "diarized," i.e., tagged or associated with a corresponding participant who spoke the utterance, such as by using speaker identification techniques to analyze the meeting audio. In some examples, diarization may include the identity of the speakers. In some examples, the identity may not be known but the roles of the speakers may be known, where roles may include "leader," "manager," "meeting facilitator," "audience member," "participant," "officer," and so forth. In addition to diarization, transcription engine 106 may also perform end type detection and segmentation on the meeting audio. In some examples, audio transcoder 104 and/or transcription engine 106 may be distributed in whole or in part to user devices 120 such that user devices 120 may perform the audio transcoding and transcription. In such cases, user devices 120 may send meeting audio 130 as transcoded audio for transcription by transcription engine 106 or, alternatively, may send a partial or complete transcript 107 for a meeting to computing system 102, rather than audio data.

Summarizer 108 processes transcript 107 for meeting audio 130 for a meeting to produce a written summary 109 of the meeting among users 119. Written summary 109 may be a non-personalized summary of the meeting between the participants. Written summary 109 may provide an overall, or general, or common summary of the meeting. Written summary 109 may include one or more meeting item summaries that each represents a summary of a meeting item within the meeting. A meeting item may include one or more utterances by meeting participants within a time period. A meeting item may include a topic of one or more utterances by meeting participants within a time period or multiple time periods. A meeting item may include a set of utterances within the meeting that relate to a single matter, where that matter can include, e.g., an episode, an introduction, an agenda, an action item or task, an explanation, an overall summary, or other type of meeting item. A meeting item summary may include the full text of the meeting item.

In some examples, computing system 102 receives or otherwise obtains the written summary 109 of the meeting among users 119 from another computing system via a network, rather than by generating the written summary 109 from meeting audio 130 or a transcript 107.

In accordance with techniques described in this disclosure, summary personalization unit 110 processes meeting summary 109 to generate one or more personalized meeting summaries 132A-132M. For example, summary personalization unit 110 may apply a model of meeting item relevance to the meeting item summaries of meeting summary 109 to identify the corresponding set of relevant meeting item summaries for each of one or more users. In general, the model of meeting item relevance specifies, for computing system 102, whether a specific meeting item or section of a meeting transcript is relevant to any participant in the meeting or other user.

Users may be users 119 or a subset thereof (i.e., the meeting participants), or may be other persons or other systems, for instance. Upon identifying the set of relevant meeting item summaries for a user, computing system 102 may generate a personalized meeting summary 132A for the user that includes, highlights, or otherwise includes indications of the relevance of the set of relevant meeting item summaries. In general, an indication of relevance for a meeting item within a personalized meeting summary 132 indicates that summary personalization unit 110 has determined that the meeting item is relevant to the user for which summary personalization unit 110 has generated the personalized meeting summary 132, which is a personalized summary of a meeting. Computing system 102 may generate personalized meeting summary 132A to exclude meeting item summaries from the meeting summary 109 that are not relevant to the user. Computing system 102 may generate multiple different personalized meeting summaries 132, each tailored by relevance to the corresponding user for which computing system 102 generates personalized meeting summary 132. Computing system 102 outputs personalized meeting summaries 132 for review or other use by the users.

Figure 2:
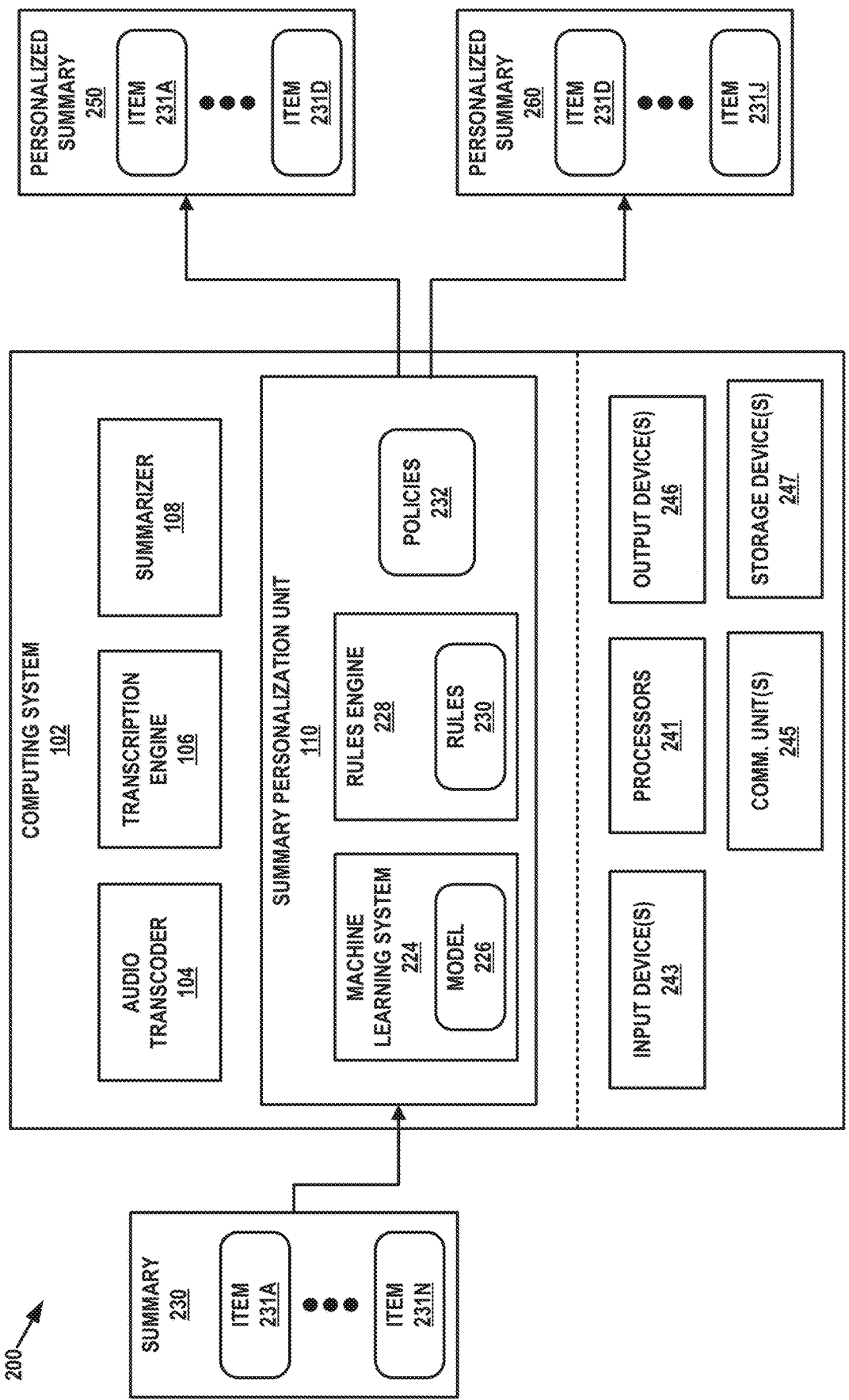
FIG. 2 is a block diagram illustrating an example instance of the computing system of FIG. 1, according to techniques of this disclosure.

FIG. 2 is a block diagram illustrating an example instance of computing system 102 of FIG. 1, according to techniques of this disclosure. In this example, computing system 102 includes one or more input devices 243, one or more processors 241, one or more output devices 246, one or more storage devices 247, and one or more communication units 245. In some examples, computing system 102 represents a cloud computing system, server farm, and/or server cluster (or portion thereof) that provides services to client devices and other devices or systems. In other examples, computing system 102 may represent or be implemented through one or more virtualized compute instances (e.g., virtual machines, containers) of a data center, cloud computing system, server farm, and/or server cluster.

One or more of the devices, modules, storage areas, or other components of computing system 102 may be interconnected to enable inter-component communications (physically, communicatively, and/or operatively). In some examples, such connectivity may be provided by through communication channels, a system bus, a network connection, an inter-process communication data structure, or any other method for communicating data.

One or more processors 241 of computing system 102 may implement functionality and/or execute instructions associated with computing system 102 or associated with one or more modules illustrated herein and/or described below. One or more processors 241 may be, may be part of, and/or may include processing circuitry that performs operations in accordance with one or more aspects of the present disclosure. Examples of processors 241 include microprocessors, application processors, display controllers, auxiliary processors, one or more sensor hubs, and any other hardware configured to function as a processor, a processing unit, or a processing device. Computing system 102 may use one or more processors 241 to perform operations in accordance with one or more aspects of the present disclosure using software, hardware, firmware, or a mixture of hardware, software, and firmware residing in and/or executing at computing system 102.

One or more communication units 245 of computing system 102 may communicate with devices external to computing system 102 by transmitting and/or receiving data, and may operate, in some respects, as both an input device and an output device. In some examples, communication unit 245 may communicate with other devices over a network. In other examples, communication units 245 may send and/or receive radio signals on a radio network such as a cellular radio network. In other examples, communication units 245 of computing system 102 may transmit and/or receive satellite signals on a satellite network such as a Global Positioning System (GPS) network. Examples of communication units 245 include a network interface card (e.g. such as an Ethernet card), an optical transceiver, a radio frequency transceiver, a GPS receiver, or any other type of device that can send and/or receive information. Other examples of communication units 245 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 243 may represent any input devices of computing system 102 not otherwise separately described herein. One or more input devices 243 may generate, receive, and/or process input from any type of device capable of detecting input from a human or machine. For example, one or more input devices 243 may generate, receive, and/or process input in the form of electrical, physical, audio, image, and/or visual input (e.g., peripheral device, keyboard, microphone, camera).

One or more output devices 246 may represent any output devices of computing system 102 not otherwise separately described herein. One or more output devices 246 may generate, receive, and/or process input from any type of device capable of detecting input from a human or machine. For example, one or more output devices 246 may generate, receive, and/or process output in the form of electrical and/or physical output (e.g., peripheral device, actuator).

One or more storage devices 247 within computing system 102 may store information for processing during operation of computing system 102. Storage devices 247 may store program instructions and/or data associated with one or more of the modules described in accordance with one or more aspects of this disclosure. One or more processors 241 and one or more storage devices 247 may provide an operating environment or platform for such modules, which may be implemented as software, but may in some examples include any combination of hardware, firmware, and software. One or more processors 241 may execute instructions and one or more storage devices 247 may store instructions and/or data of one or more modules. The combination of processors 241 and storage devices 247 may retrieve, store, and/or execute the instructions and/or data of one or more applications, modules, or software. Processors 241 and/or storage devices 247 may also be operably coupled to one or more other software and/or hardware components, including, but not limited to, one or more of the components of computing system 102 and/or one or more devices or systems illustrated as being connected to computing system 102.

In some examples, one or more storage devices 247 are temporary memories, meaning that a primary purpose of the one or more storage devices is not long-term storage. Storage devices 247 of computing system 102 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 320, in some examples, also include one or more computer-readable storage media. Storage devices 320 may be configured to store larger amounts of information than volatile memory. Storage devices 320 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Summary personalization unit 110 in the example of FIG. 2 includes a machine learning system 224 and a rules engine 228. Various examples of summary personalization unit 110 may include a machine learning system 224, a rules engine 228, or both a machine learning system 224 and a rules engine 228. Machine learning system 224 processes training data to train model 226 to identify relevant meeting items for different users. Model 226 is an example of at least part of a model of meeting item relevance for a computing system for automatically providing personalized summaries of meetings.

Machine learning system 224 may include one or more neural networks, such as one or more of a Deep Neural Network (DNN) model, Recurrent Neural Network (RNN) model, and/or a Long Short-Term Memory (LSTM) model. In general, DNNs and RNNs learn from data available as feature vectors, and LSTMs learn from sequential data. As used herein, "A and/or B" should be interpreted as "A, B, or A and B."

Machine learning system 224 apply other types of machine learning to train model 226 to identify relevant meeting items for different users. For example, machine learning system 224 may apply one or more of nearest neighbor, naïve Bayes, decision trees, linear regression, support vector machines, neural networks, k-Means clustering, Q-learning, temporal difference, deep adversarial networks, or other supervised, unsupervised, semi-supervised, or reinforcement learning algorithms to train model 226.

Training data may include a set of training meeting item summaries, where each of the training meeting item summaries has associated data specifying relevance to a set of one or more users. For example, a particular training meeting item summary may be marked as being relevant to a role, to a particular user, as relevant to all users, etc. Users may provide indications of interest in meeting items using a user interface that is output by computing system 102 or user devices 120 for display, via output device(s) 246, on a display device such as a computer monitor. For example, while machine learning system 224 is in learning mode, all meeting item summaries (or meeting items) may be presented to all users that may be involved in meetings. Machine learning system 224 receives, via the user interface, indications of interest by individual users as to particular meeting items or item summaries. Indications of interest may include time viewing or scrolling through the items, editing or deleting of meeting items, sharing of items, marking of items as important or less important by selecting buttons, search behavior, transcription engine confidence, user voting, backchannel audio indications. Learning may be implemented using a variety of implicit or explicit techniques or a combination of both. In one example, computing system 102 or user devices 120 outputs a user interface to each participant to view output summarizations and may record scrolling behavior of the user. If a user scrolls to and/or spends more time on specific meeting items, that may be regarded as indications of interest in that type of meeting item to that user. Alternatively, or in addition, users may be able to interactively select meeting items as being of interest using the user interface. Meeting items that are thereby identified as being of interest to a given user can be used as training examples for model 226 of the meeting item, meeting items types, meeting item content/topics, or other meeting item characteristics of relevance of each user over time. For example, it may turn out that during learning mode, a particular user consistently shows interest in the "previous action item review" meeting item, such as by always scrolling to this section. Thus, in future meetings, once this relevance to that user is learned, the summary personalization unit 110 may associate this type of meeting item as being relevant to that user.

In another example of a learning technique, content of the meeting items may be used to determine relevancy. The machine learning system 224 may discover a user's interest in a particular topic based on search behavior. As an example, search behavior may be evidenced when the user repeatedly searches for specific terms or phrases within a non-personalized summary. These specific terms or phrases may then be clustered into one or several topics of interest for each user. In a further variation, the contents of meeting items selectively viewed or listened to by a user (e.g. via scrolling or search retrieval) may be fed to a clustering algorithm to determine topics of apparent interest. Once a topic or topics of interest are determined, then in future non-personalized summaries, if these topics are encountered as determined by specific terms or phrases, then summary personalization unit 110 may determine the meeting item containing these topics is relevant to the specific user.

In an example, a user's personal model of model 226 may be learned and saved within the user's user device 120, e.g., by meeting application 122. Thus, each user device 120 may store a personal model of the associated user 119's interests generated by machine learning based on observation of the user's reviewing behavior. This personal model may then be sent to summarization personalization unit 110 during or after a meeting for incorporation within model 226 for application by machine learning system 224 operating in prediction mode. Summary personalization unit 110 can then use this model to determine the relevancy of each meeting item of the summary for a given participant based on the interest level exhibited by that participant in the past.

In an example, machine learning system 224 may cluster a group of users based on similar roles, such as job functions. The information about the role may be obtained using multiple techniques. In one technique, users 119 may enter their roles using a user interface of meeting application 122; this information may be subsequently communicated to summarization personalization unit 110. In another technique, the organizer of the meeting may enter the role of each user 119. Machine learning system 224 may group users 119 according to role and specify that the relevance of at least some types of information is similar within the same role. Thus, as machine learning system 224 learns a relevance model for one individual having one role, it may associate that interest model with all individuals with that same role. As another example, machine learning system 224 may learn from one project resource that new action items are of high relevance. Machine learning system 224 may then associate this interest in new action items to all project resources, where project resources in this case may refer to project software used to complete project-related action items, for example.

Rules engine 228 applies one or more rules 230 configured by an administrator or one or more users to determine relevancy of meeting item summaries 231 for users. Rules 230 for determining the relevance of meeting items to particular users may be are defined by an authorized individual, such as the user, the user's manager, an administrator, or the meeting organizer. Such individuals may enter rules using a user interface output by computing system 102 via output device(s) 246 for display at a display device, or by storing rules 230 to a storage device. Rules 230 may specify relevance for meeting item summaries 231 by positively specifying that a characteristic of a meeting item summary is relevant to particular users, or by negatively specifying that a characteristic of a meeting item summary is not relevant to particular users. A negative rule reduces the likelihood that rules engine 228 will cause summary personalization unit 110 to include a meeting item summary meeting the condition of the negative rule in a personalized meeting summary. For example, a negative rule may specify that meeting item summaries that describe hardware are not relevant to users with a "software" role.

Rules 230 may be input in various forms, including in the form of a table or list. Third-party or other external software may interface with computing system 102 to configure rules 230. For example, certain users may be associated with a project or other association managed using the external software. The users may be a Group, a Conversation, Friends, Project members, or the like. The external software may configure, or computing system 102 may generate, using information from the external software, rules 230 to specify the relevance of meeting items discussion or otherwise bearing on the project or other association to those associated users.

An example table of rules is depicted in FIG. 6. In table 600, the meeting organizer has determined that all meeting items are relevant for Participant 1 (e.g., user 119A), but only the meeting item "Agenda" is relevant to Participant 2 (e.g., user 119B). Thus, once a meeting is summarized into meeting items 232 of summary 230, summary personalization unit 110 may determine the relevancy of each meeting item to each participant based on this table 600.

Various other types of rules 230 may be set up. For example, one rule 230 may be based on the content of the meeting items. In this case, rules engine 228 may analyze meeting item summaries 231 for certain terms or phrases and these terms or phrases may be associated with certain participants according to their roles. As an example, terms or phrases that are related to finance may be associated with the financial officer or the person responsible for the finances. The terms or phrases and the association to roles may be configured as rules 230 by an authorized individual.

For example, a rule 230 can specify that whenever a meeting participant's name is recognized by summary personalization unit 110 as occurring in the transcript content for a given meeting item, that meeting item may be determined to be relevant to that meeting participant referenced. In one implementation of this concept, summary personalization unit 110 may perform name recognition of the transcript 107 and/or meeting audio 130. Summarizer 108 may preserve the names of individuals referenced in a transcript 107 when creating meeting item summaries 231. Alternatively, if transcript 107 is directly available to summary personalization unit 110, summary personalization unit 110 can match the names to the participants, and rules engine 228 can in turn determine that the specific meeting item summaries 231 corresponding to meeting items that contain certain names are relevant to corresponding individuals, as per the rule 230.

For example, rules 230 may be set up based on the meeting type. The meeting type may be specified by the meeting organizer. Meeting types may include but not be limited to daily standup meetings, all-hands meetings, sales meetings, one-on-one meetings or cross-company meetings (where more than one company is involved). In each of these meeting types, presets may be defined within summary personalization unit 110 in policies 232. Within these presets, rules 230 describing the relevance of the information to various roles or participants may be defined. As an example, in an all-hands meeting, everybody who is a participant in the meeting may receive personalized summaries that include all information that was presented. In another example, in standup meetings, only the action items relevant to each participant may be included in personalized summaries generated and presented to that participant. Examples of setting of presets is described below.

In some configurations, meta-information may be provided to summary personalization unit 110 by the preceding component such as summarizer 108. This meta-information may include a confidence value that is a measure of confidence in the information provided by this component. Rules 230 may be configured that dictate how information is displayed based on the confidence value. As an example, if the confidence value is low, then a rule 230 may exclude that information being displayed or processed. As another example, combining the concept of the meeting type and confidence values, a rule 230 may be defined such that in a cross-company meeting, only information with high confidence values may be displayed or transmitted to an external company.

Thus, by configuring rules 230 for application by rules engine 228, the relevance of specific portions of each meeting summary for each participant may be determined. Rules engine 228 may be used standalone, or in conjunction with machine learning system 224 applying model 226.

In some examples, model 226, rules 230, and/or policies 232 may be updated as roles change, users change, user preferences change, additional indications of interest in certain meeting items are provided to summary personalization unit 110, and the system otherwise dynamically learns and refines the model 226, rules 230, and/or policies 232 to progressively enhance the salience of meeting items within personalized summaries 250, 260 generated and output to users.

Summary 230 is an example of written summary 109 of FIG. 1 and includes multiple meeting item summaries 231A-231N. Each of the meeting items may be, for instance, an "Intro", "Agenda", "Previous action item review", "New action item", "Discussion", or "Summary", to provide a few non-limiting examples. Summary personalization unit 110 may receive summary 230 from summarizer 108 executed by computing system 102, or from an external one or more devices, such as storage servers or application servers. Summary 230 is non-personalized.

In some examples, summary personalization unit 110 applies back-channel analysis. As noted above, a transcript 107 or meeting audio 130 or both may be sent directly to summary personalization unit 110. In one example of the use of such information, summary personalization unit 110 may perform back-channel analysis of meeting audio 130 to determine the relevance of information for individual participants. Back-channel signals include verbal sounds made by the listener that can communicate or indicate the listener's comprehension or interest or both in the information that is being provided by the speaker. These verbal sounds may include words, questions or sentence completions by the listener, non-verbal audio cues; it may also include non-lexical sounds such as "hmmm" or "huh". In the context of summary personalization unit 110, back-channel information may be applied to determine the relevancy of information. In one example, if there is one dominant speaker, increase in an amount of back-channel information from the other participants may be used as an indication that the information provided by the dominant speaker is relevant to all participants. In an implementation of this technique, summary personalization unit 110 may monitor the amount of back-channel information including whether the back-channel information is being generated by one or several listeners. Summary personalization unit 110 may measure the amount of back-channel information associated with each meeting item 231 using various techniques; for example, it may be measured by the frequency and/or duration of back-channel information detected during a meeting item. If this number exceeds a certain value (the value may be programmable or preset), summary personalization unit 110 may then determine that the associated meeting item 231 is of relevance to all participants. Association with meeting items 231 may be done using various techniques. In one technique, meeting items 231 may contain meta-information such as but not limited to timestamps. In addition, diarized transcript 107 may also contain timestamps along with the transcribed information. By matching the timestamps, summary personalization unit 110 can associate the back-channel information with the corresponding meeting item 231. Thus, with this technique, if the amount of back-channel information is larger than a preprogrammed threshold, then summary personalization unit 110 may determine that information is "common information," that is, information that is deemed likely relevant to all participants in the meeting.

In some examples, summary personalization unit 110 may use back-channel information to determine relevance for the specific individuals who participated in an actual discussion. For example, relevance may be determined for the participant who is the main speaker at the time of significant back-channel activity, as well as for those participants who are identified (using speaker identification) as interacting with that speaker based on the back-channel information.

Thus, as described above, various techniques may be utilized to determine the relevance of the information. In some examples, after relevance is determined using one or more of the above techniques (e.g., machine learning, rules, and/or back-channel analysis), the relevance results from the various relevancy techniques may integrated and a single relevance determination may be made for each user.

Not all of meeting item summaries 231 may be relevant to every participant in a meeting from which summary 230 was generated, nor to every user that is to receive any of personalized summaries 250 or 260. Summary personalization unit 110 executes machine learning system 224, rules engine 228, and/or back-channel analysis to generate one or more personalized summaries by determining the relevant meeting items 231 for users. In the example of FIG. 2, summary personalization unit 110 determines meeting items 231A-231D are relevant for a first user and generates personalized summary 250 that includes meeting items 231A-231D, and summary personalization unit 110 determines meeting items 231D-231J are relevant for a second user and generates personalized summary 260 that includes meeting items 231D-231J.

Figure 7:
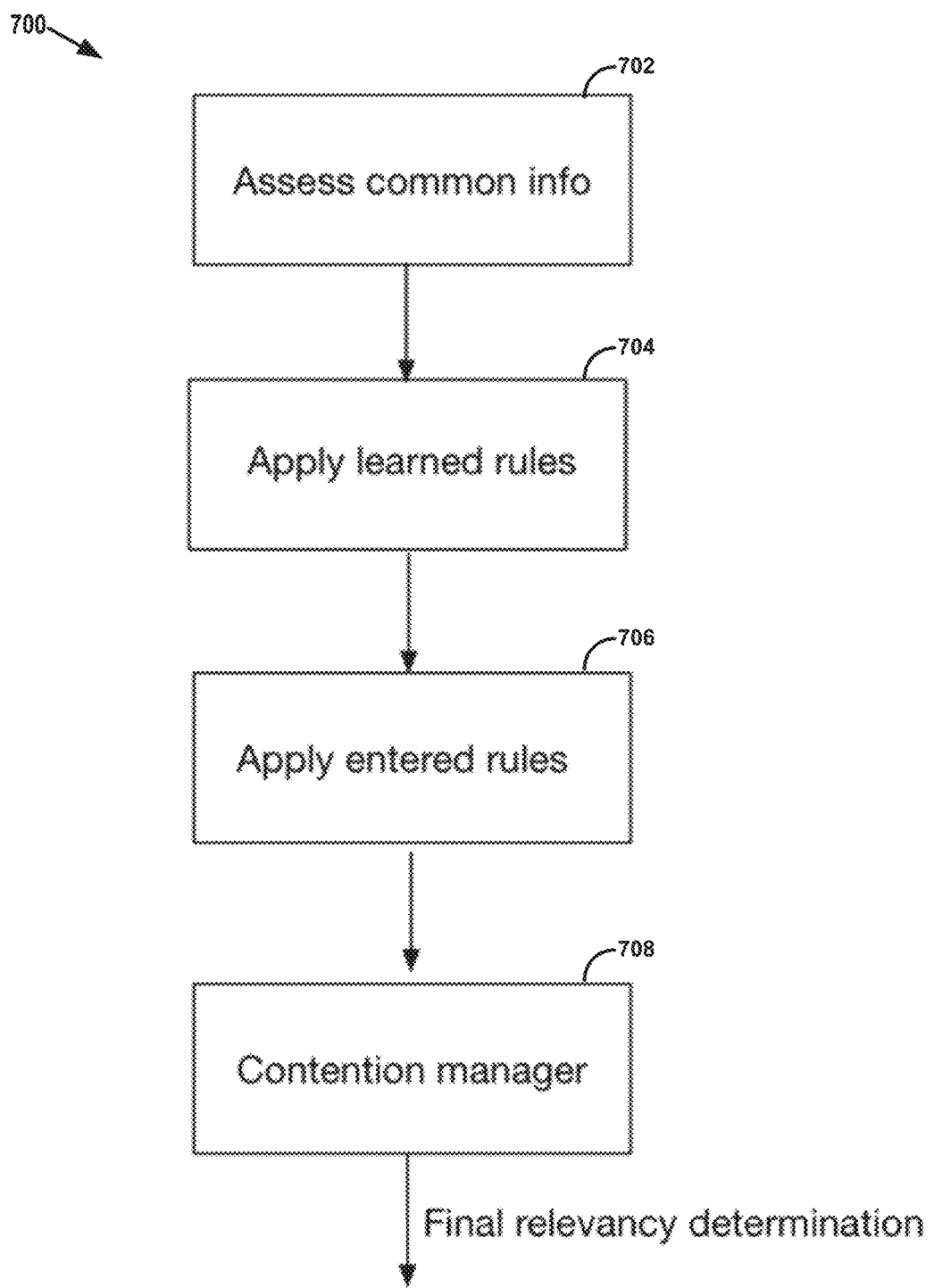
FIG. 7 illustrates an example mode of operation of a computing system to use multiple relevancy determination techniques in combination, according to techniques described herein.

In the descriptions above, several different techniques to determine the relevance of the meeting items have been described. These techniques may be applied alternatively or may be applied in combination. FIG. 7 illustrates an example mode of operation of computing system 102 to use these techniques in combination. In this operation, the relevance of each meeting item is first determined independently by each technique. For a given user, for each of meeting items 231, e.g., computing system 102 assesses common information for the meeting item (702), e.g., by using the back-channel analysis to determine the meeting item includes common information relevant to all participants. Rules engine 228 applies rules 230 to determine whether the meeting item is relevant to the user (704). Machine learning system 224 applies model 226 to determine whether the meeting item is relevant to the user (706). In various examples, any one or more of steps 702, 704, or 706 may be performed.

In some cases, a contention may arise among the results of the different techniques. For example, rules 230 may specify relevance for a meeting item to a user, while model 228 may specify no relevance for the meeting item to the user. Summary personalization unit 110 may execute a contention manager to resolve the contention (708). The contention manager may be configured in various ways to resolve the contention, such as in the following examples.

FIG. 8A depicts an example table 800 showing the results of the relevance determination with each technique. In this example, there are three participants in the meeting P1, P2 and P3. Meeting item 1 was determined to be common information relevant to all participants, for example based on the back-channel analysis technique described above. Table 800 further indicates that Meeting item 1 was also deemed to be relevant to all participants based on learned models. However, using the entered rules technique, Meeting item 1 was only deemed to be relevant to P1 and P2. The contentions manager may be programmed in several ways to accommodate such contentions. Table 800 depicts one technique.

In this technique of table 800, if any of the relevancy determination techniques determines that a particular meeting item is relevant to a particular participant, then the meeting item is determined to be relevant to that participant regardless of the results of the other modules. Thus, per table 800, Meeting item 1 is determined to be relevant to P1, P2 and P3 according to the back-channel analysis (common information) and machine learning system 224. However, rules engine 228 determined that Meeting item 1 was only relevant to P1 and P2. In this case, the contentions manager of summary personalization unit 110 determined that Meeting item 1 was relevant to P1, P2 and P3 because Meeting item 1 is relevant according to at least one the relevancy determination techniques.

In table 800, Meeting item 2 was determined to be relevant to P1 and P2 in view of common information, but rules engine 228 and machine learning system 224 made no determinations. In this case, the contentions manager determines that Meeting item 2 is relevant to P1 and P2. The same logic is applied to Meeting item 3 where the relevance respectively found by the machine learning system 224 (relevant to P1) and rules engine 228 (relevant to P2 & P3) were combined by the contentions manager to determine the overall relevance (relevant to P1, P2, & P3) of Meeting item 3.

In another technique, illustrated in FIG. 8B depicting table 802, priority levels may be assigned to each technique. Further, in this example, if a technique determines that a particular meeting item is relevant only to certain individuals, then that determination is understood as implying the meeting item is irrelevant to the other individuals; whereas if a finding of "no determination" is made by a specific technique, then that indicates the technique has not determined either relevance or irrelevance and the contentions manager may be configured to ignore the result from this technique for that meeting item. As an example, the common information may be assigned the lowest priority (example: priority 3), followed by the machine learning system 224 that may be assigned medium priority (example: priority 2) and the rules engine 228 that may be assigned the highest priority (example: priority 1). The contention manager may be configured such that the higher priority technique supersedes the techniques with lower priority. For Meeting item 1, there is no contention to resolve with respect to P1 and P2, as all techniques determined that Meeting item 1 was relevant to those individuals. However, for P3, the entered rules technique determined that Meeting item 1 was not relevant and since the entered rules technique has higher priority than the priority of other techniques, the contention manager may be configured to make the final decision that this information is not relevant for P3. This is reflected in the results column.

Continuing with the figure, Meeting item 2 was determined to be common information for P1 and P2 but not for P3. As explained earlier, this may have been determined using back-channel information between P1 and P2. In this case, no determination was made for any participants with the learned models or the entered rules technique. Thus, in this case, although the priority of the common information technique is low, the contentions manager determined that the information was relevant to P1 and P2.

In a final example, for Meeting item 3, no determination was made based on common information. Rules engine 228 determined Meeting item 3 to be relevant to P2 and P3 but not to P1. However, machine learning system 224 determined this meeting item to be relevant to P1. Here too, there are various ways of handling this type of contention. In one technique, since the rules engine 228 determined that Meeting item 3 was not relevant to P1, and it has the highest priority, the information is deemed to be not relevant to P1. Thus, as illustrated in the results column, the meeting item is determined to be relevant only to P2 and P3. In an alternative version of method, rules engine 228 may make no determination (as opposed to affirmatively determining no relevancy) with regards to P1. This may happen for example, when the P3's role was not recognized by rules engine 228. In this case, the contentions manager may decide that based on machine learning system 224, Meeting item 3 is relevant to P1; thus, in this case Meeting item 3 may be deemed relevant to P1, P2 and P3.

In some cases, summary personalization unit 110 may use a multi-variate ensemble of adaptive weight regressed on both the rules 230-based relevance and model 228-based relevance in order to determine, and in some cases maximize, final relevancy.

These examples illustrate one example of how the contentions manager may be configured to make the final determination of the relevance of a specific piece of information for a specific individual. Once such relevance information is determined, summary personalization unit 110 may generate a personalized summary for the individual.

Summary personalization unit 110 may have other inputs such as but not limited to information from external sources. An example of an external source is the JIRA database for JIRA for task management, developed by Atlassian. This information may be used to determine the relevance of information depending on whether related information is present in the external source. An example of how this information may be utilized is as follows: the external source may provide a list of topics that are relevant to the participant. Rules engine 228 may use this list of topics to determine the relevance of the information conveyed during the meeting. This may be done using various techniques such as but not limited to searching for words or phrases that are common between the transcript generated during the meeting and the list of topics. If matches are found, then the section containing the specific words or phrases may be considered as relevant and configured in rules 230.

Figure 4:
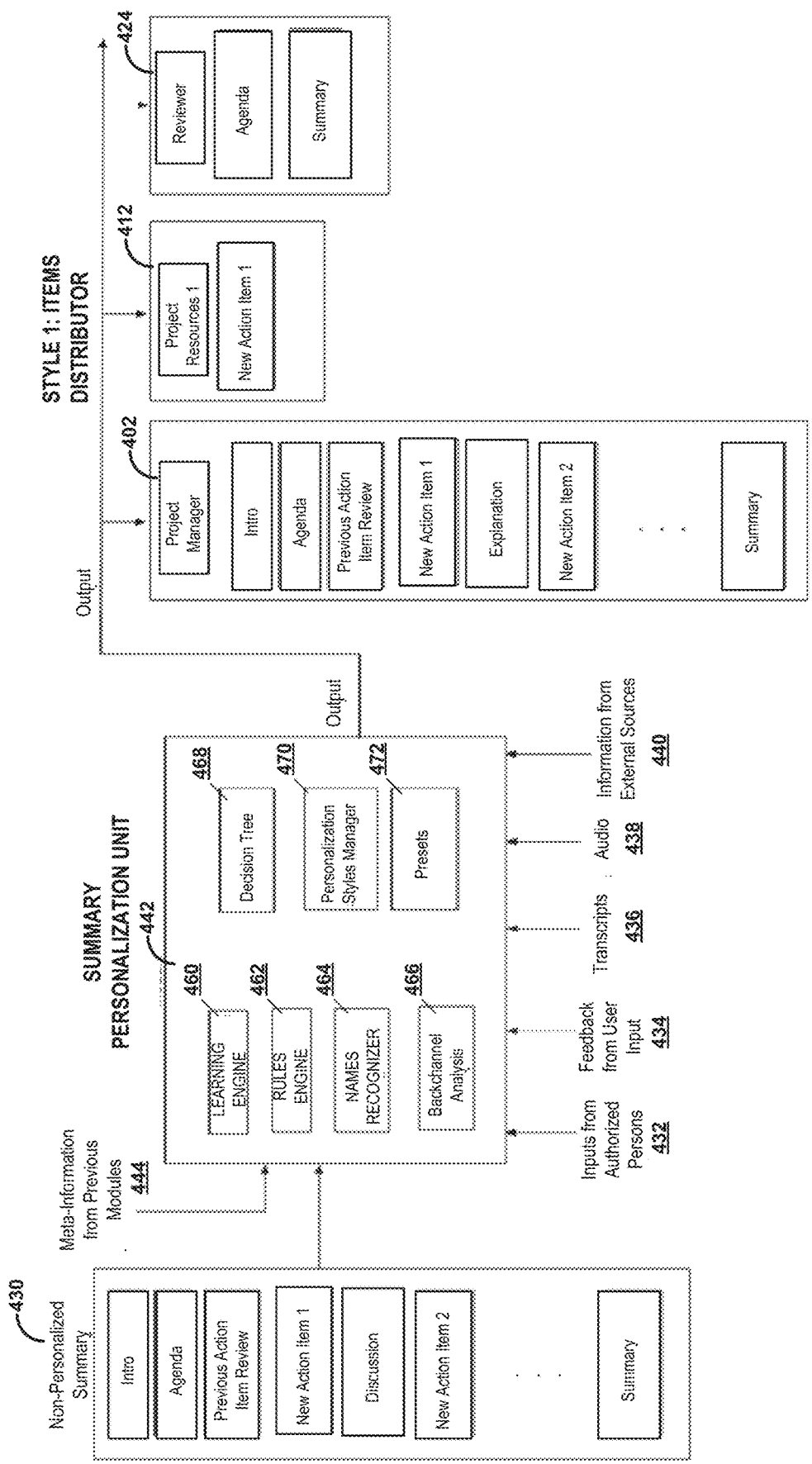
FIG. 4 is a block diagram illustrating an example instance of a summary personalization unit and depicting a personalized summary style, according to techniques described herein.

In some examples, summary personalization unit 110 may generate personalized summaries to indications of relevance of meeting items in different ways according to different styles. Users may configure their preferred style in policies 232. Based on the configured style, summary personalization unit 110 may determine how the relevant information is displayed to each participant once the relevant information determination is made using the techniques described above. In one example output illustrated in FIG. 4, summary personalization unit 110 generates personalized summaries 402, 412, 424 to include only the relevant information to each participant. Computing system 102 may output personalized summary 402, for instance, to user device 120A for display at a display device by meeting application 122A. Thus, as illustrated in FIG. 4, summary personalization unit 110 may generate personalized summary 402 to include all of the meeting items from non-personalized summary 430 for the Project Manager, while summary personalization unit 110 may generate personalized summary 412 to include only the meeting item"New action item 1" for Project Resources 1. Similarly, if a Reviewer were present in the meeting, the only relevant meeting items for this individual may be the "Agenda" and the "Summary"; thus, for this individual, the summary personalization unit 110 may generate personalized summary 424 to only include these two meeting items. Again, computing system 102 may output the personalized summaries to the corresponding user devices, may store the personalized summaries to a storage location, or may generate user interfaces to output the personalized summaries to users.

Figure 5:
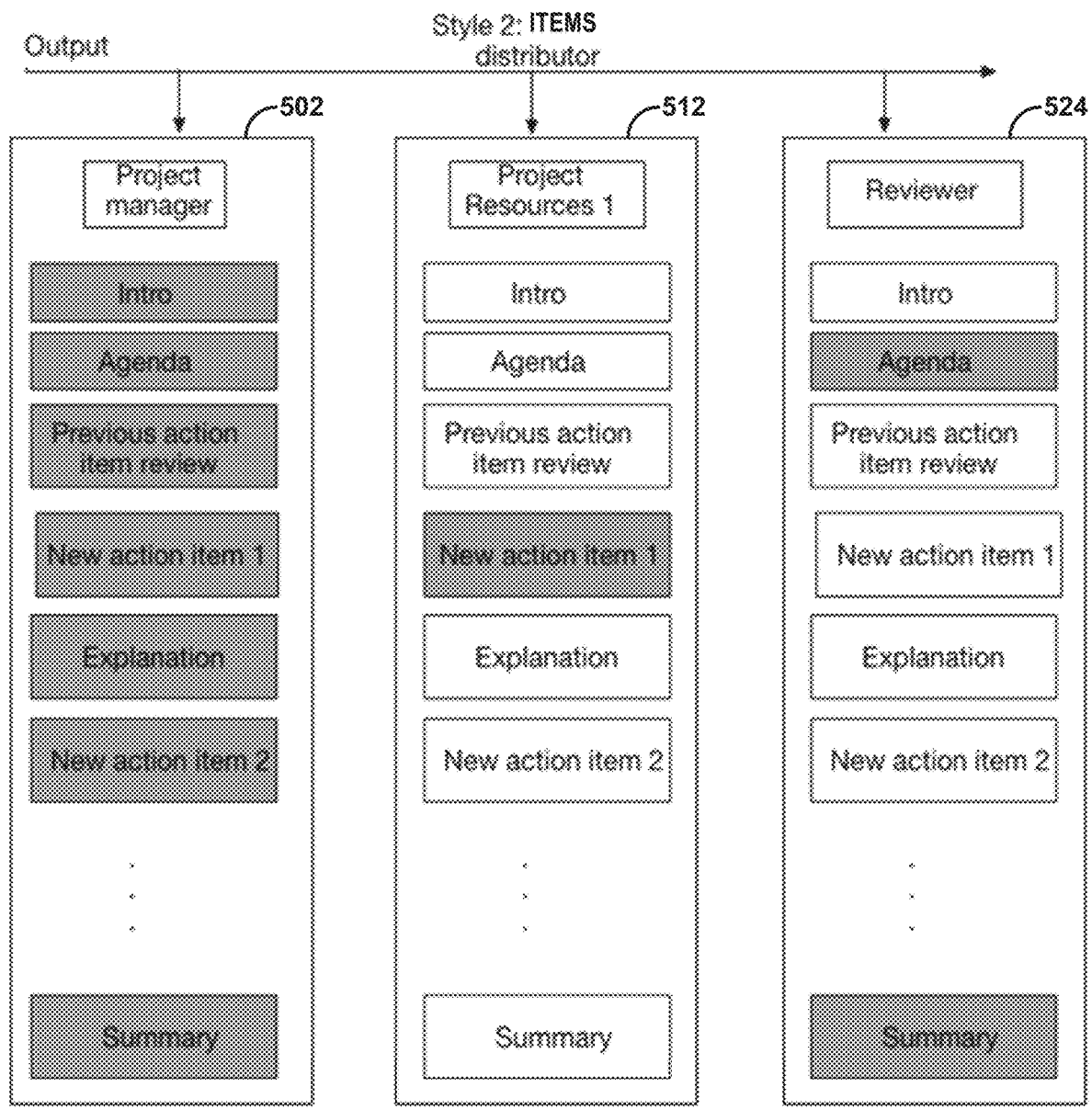
FIG. 5 is a block diagram depicting a personalized summary style, according to techniques described herein.

Another example output is illustrated in FIG. 5. In this example, summary personalization unit 110 generates personalized summaries 502, 512, 524 to include all of the meeting items from non-personalized summary 430. However, the relevant meeting items for each recipient as determined by summary personalization unit 110 are highlighted for that recipient; the highlighted portions may thus be different for each participant as illustrated in FIG. 5. Thus, as in FIG. 4, for the Project Manager every meeting item is highlighted, but for Project Resource 1 only 'New Action Item 1' is highlighted. Thus, for example, if each participant were to be viewing the summary in his or her own user device, only the meeting items relevant for a given participant would be highlighted in the user interface displayed by their associated user device. Accordingly, generating a personalized summary may include generating a user interface to display a personalized summary to in a manner that indicates the relevancy of one or more meeting items of a meeting.

As noted above, summary personalization unit 110 may allow an authorized person to determine which type or style of display to use. This may be done via meeting application 122 the authorized person is using. Alternatively, the display method may be preconfigured during the set up and installation process or during manufacturing.

In some cases, computing system 102 may recharacterize a meeting item summary into a task, calendar item, or other record usable by external software. For example, computing system 102 may recharacterize an Action Item meeting item summary to generate a task and invoke an application programming interface of the external software to create the task in the external software, such as JIRA or customer relationship management software. As another example, computing system 102 may recharacterize an appointment-related meeting item summary to generate a calendar item and invoke an application programming interface of the external software to create the calendar item in the external software. As other examples, computing system 102 may auto-populate an email with portions of a meeting item summary or share the portions of a meeting item summary in a messaging system, such as a social messaging system. As other examples, computing system 102 may perform an Internet search or a search for content on the user's workstation to automatically resolve the task generated from a meeting item summary.

In some cases, computing system 102 may output additional media items along with a personalized summary. For example, computing system 102 may receive multimedia presented along with meeting audio 130. Certain multimedia may be displayed or played during a meeting item. If a meeting item summary is relevant to a user, computing system 102 may output the multimedia item (such as a screenshot or video or slide) to the user along with the personalized summary including the relevant meeting item summary.

In some cases, computing system 102 may determine salience scores to indicate the magnitude of relevancy for one or more of the meeting item summaries included in a personalized summary. Computing system 102 may indicate the salience score for each meeting item summary in the personalized summary. Salience scores may be indicated using colors (e.g., red, yellow, green), integers or other numbers, tags (e.g., "very relevant", "sort of relevant", "not relevant"), glyphs (e.g., 2 circles—very relevant, 1 circle—sort of relevant, 1 square—not relevant), and so forth. Rules 230 and policies 232 may specify salience for meeting items, which may be used by computing system 102 to generate salience scores for each meeting item summary in the personalized summary. For example, one or more rules 230 may specify high salience to a user for certain types of meeting items based on indications of interest from the user for those types of meeting items. As another example, one or more rules 230 may specify that a meeting type is somewhat salient for a particular role type. Salience may be cumulative, in that salience specified multiple rules 230 may be accumulated to produce an overall salience of a meeting item summary for a user.

Figure 3:
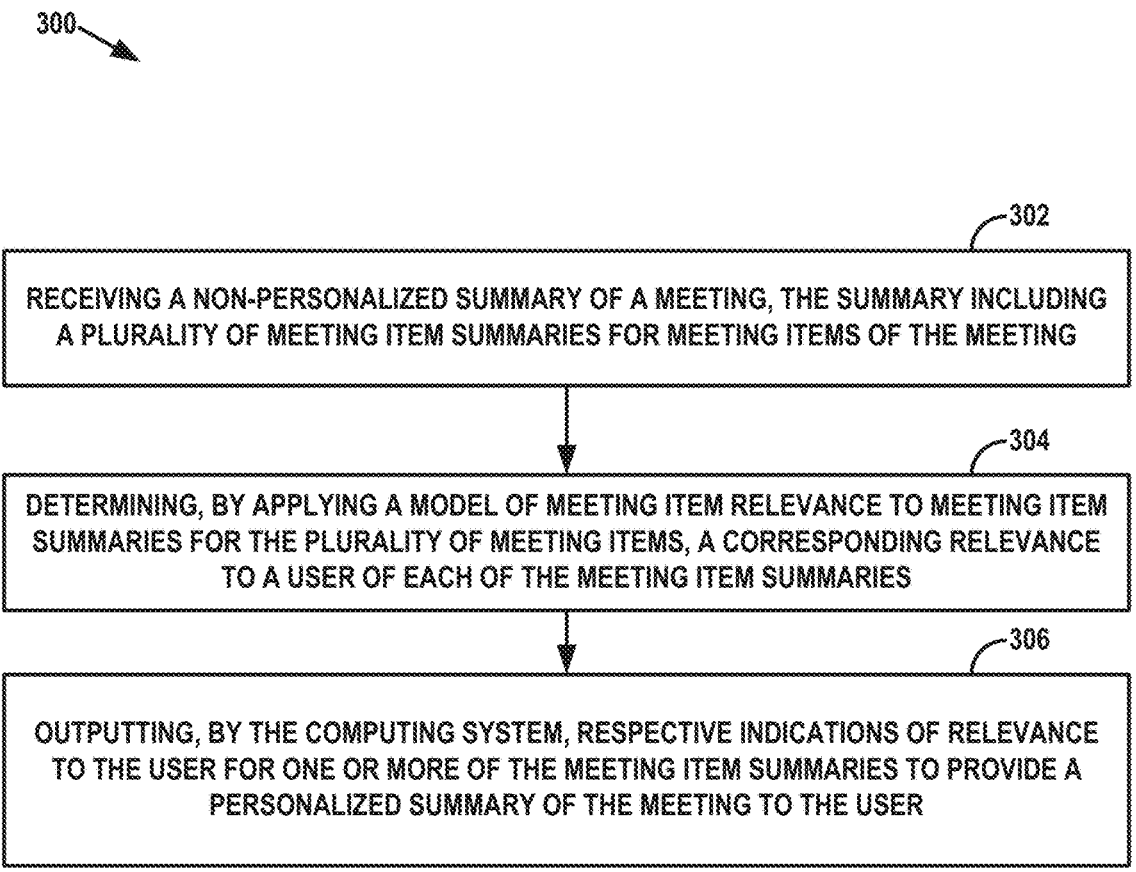
FIG. 3 is flowchart illustrating an example mode of operation for a computing system for automatically providing personalized summaries of meetings.

FIG. 3 is flowchart illustrating an example mode of operation for a computing system for automatically providing personalized summaries of meetings. A mode of operation 300 is described with respect to computing system 102. Computing system 102 obtains a non-personalized summary of a meeting, the summary including a plurality of meeting item summaries for meeting items of the meeting (302). Computing system 102 may generate the non-personalized summary from a transcript, which computing system 102 may generate from meeting audio. Computing system 102 may receive the non-personalized summary from another device via a network, for instance. Each of the plurality of meeting items may include at least one utterance by any meeting participant. For a particular user, computing system 102 determines, by applying a model of meeting item relevance to the respective meeting item summaries for the plurality of meeting items, a corresponding relevance to a user of each of the meeting item summaries (304). The model of meeting item relevance may include rules 230 and/or model 226 of FIG. 2, for instance. Computing system 102 may output respective indications of relevance to the user for one or more of the meeting item summaries to provide a personalized summary of the meeting to the user.

FIG. 4 is a block diagram illustrating an example instance of a summary personalization unit and depicting a personalized summary style, according to techniques described herein. Summary personalization unit 442 may represent an example instance of any of summary personalization units 110 described elsewhere in this disclosure. Learning engine 460 may represent an example instance of machine learning system 224. Rules engine 462 may represent an example instance of rules engine 228. Names recognizer 464 performs name recognition of participants from meeting transcripts and/or meeting audio. Back channel analysis 466 performs back-channel analysis. Decision tree 468 may be an example of a data structure used by summary personalization unit 442 to resolve contentions among the learning engine 460, rules engine 462, and back channel analysis 466, as described with respect to FIGS. 8A-8B. Personalization styles manager 470 may control the style of personalized summaries generated by summary personalization unit 442. Presets 472 are example presets.

Summary personalization unit 442 may receive inputs from many different sources, such inputs including inputs 432 from authorized persons, feedback 434 from user input, transcripts 436, audio 438, information 440 from external sources such as applications. Summary personalization unit 442 may also generate personalized summaries using meta-information 444 from previous modules, such as a transcoder, summarizer, or transcription engine. For example, aggregate meeting items and accompanying meta information of one or multiple organizations may be combined with data on the role types to which the meeting items have been displayed and, in some cases, for each meeting item, the user feedback obtained on the relevancy of the meeting item to that role type. The data may be used to train a co-clustering or a deep learning model to provide word clusters or deep learning embeddings of phrases to provide, based on the relevancies, a recommendation of certain phrase types to certain user roles or behavior patterns. That phrase data can be used by learning engine 460 to provide personalized selection of meeting items, in some cases, without any input from a particular user.

As another example, feedback 434 from user input may be provided to summary personalization unit 442 in real-time while one or more users are discussing a non-personalized summary 430 or are otherwise discussing the meeting. This feedback 434 may include indications of interest from user in meeting item summaries that can be used by summary personalization unit 442 to adjust rules 230, model 226, or polices 232 that make up the model of meeting item relevance. Summary personalization unit 442 can then apply this adjusted model of meeting item relevance to further meeting item summaries being received in near real-time while the meeting is ongoing, thus progressively enhancing the determination of relevance of meeting items during the course of the meeting. Summary personality unit 442 may output indications of such relevance.

In some examples, summary personalization unit 442 generates and outputs personalized summaries of meeting to users shortly after conclusion of the corresponding meeting. In some examples, summary personalization unit 442 generates and outputs personalized summaries of meetings in an iterative manner. For instance, summary personalization unit 442 may receive additions to a non-personalized summary 430, while a meeting is in progress, the additions including additional meeting items. As the additions are received, summary personalization unit 442 may process the one or more meeting items in each addition in near real-time to determine relevance of the meeting items to the user. Summary personalization unit 442 may then provide updates to the personalized meeting summaries in near real-time, these updates including indications of relevance of each meeting item included in the updates.

The above examples, details, and scenarios are provided for illustration, and are not intended to limit the disclosure in any way. Those of ordinary skill in the art, with the included descriptions, should be able to implement appropriate functionality without undue experimentation. References in the specification to "an embodiment," "configuration," "version," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Examples in accordance with the disclosure may be implemented in hardware, firmware, software, or any combination thereof. Modules, data structures, function blocks, and the like are referred to as such for ease of discussion and are not intended to imply that any specific implementation details are required. For example, any of the described modules and/or data structures may be combined or divided into sub-modules, sub-processes or other units of computer code or data as may be required by a particular design or implementation. In the drawings, specific arrangements or orderings of schematic elements may be shown for ease of description. However, the specific ordering or arrangement of such elements is not meant to imply that a particular order or sequence of processing, or separation of processes, is required in all embodiments.

In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure. This disclosure is to be considered as exemplary and not restrictive in character, and all changes and modifications that come within the spirit of the disclosure are desired to be protected.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, processing circuitry, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), Flash memory, a hard disk, a CD-ROM, a floppy disk, a cassette, magnetic media, optical media, or other computer readable media. A computer-readable medium may include any mechanism for storing or transmitting information in a form readable by a machine. For example, a computer-readable medium may include any suitable form of volatile or non-volatile memory. In some examples, the computer-readable medium may comprise a computer-readable storage medium, such as non-transitory media. The term "non-transitory" may indicate that the storage medium is not embodied in a carrier wave or a propagated signal. In certain examples, a non-transitory storage medium may store data that can, over time, change (e.g., in RAM or cache).

What is claimed is:

1. A method for automatically providing personalized summaries of meetings, the method comprising:
   outputting, to a user interface, a list of one or more training meeting item summaries;
   receiving, at the user interface, a user action that is an indication of interest for a training meeting item summary of the training meeting item summaries;
   processing, by a computing system, the training meeting item summaries to train a machine learning model of meeting item relevance to identify meeting item summaries relevant to a user, wherein the training meeting item summary of the training meeting item summaries has associated data indicating the relevance of the training meeting item summary to a set of one or more users including the user, the associated data based on the indication of interest for the training meeting item summary of the training meeting item summaries;
   receiving, by the computing system, a plurality of meeting item summaries of respective meeting items of a meeting;
   determining, by the computing system, by applying a model of meeting item relevance to the meeting item summaries, a corresponding relevance to the user of each of the meeting item summaries, wherein the model of meeting item relevance comprises the machine learning model of meeting item relevance; and outputting, by the computing system, respective indications of relevance to the user for one or more of the meeting item summaries to provide a personalized summary of the meeting to the user.

2. The method of claim 1, wherein applying the model of meeting item relevance comprises applying, by the computing system, the machine learning model of meeting item relevance to the meeting item summaries to determine a corresponding relevance to the user of each of the meeting item summaries, wherein the machine learning model is trained to identify meeting item summaries relevant to the user.

3. The method of claim 1,
wherein the user action comprises one or more of: (1) selection by at least one of the users of the training meeting item summary from the list of the training meeting item summaries, (2) scrolling by at least one of the users to a location of the training meeting item summary in the list of the training meeting item summaries, or (3) searching for a term included in the training meeting item summary.

4. The method of claim 1,
wherein the user has a role of a plurality of different roles, wherein each particular user of the users has a role of the plurality of different roles and each of one or more indications of interest to a particular user from the users is associated with the role of the particular user, the method further comprising:
processing each of the indications of interest by processing the role of the particular user associated with the indication of interest to identify meeting items relevant to the user based on the role of the user.

5. The method of claim 1, wherein applying the model of meeting item relevance comprises applying, by the computing system, one or more rules that each specifies a relevance to the user of: (1) a type of meeting item summary, (2) content in meeting item summaries, or (3) a particular meeting item summary, to identify meeting item summaries relevant to the user.

6. The method of claim 1, wherein applying the model of meeting item relevance comprises:
determining, by the computing system, that a meeting item of the meeting items comprises at least one utterance by a particular meeting participant; and
determining, by the computing system, utterances by the particular meeting participant are relevant to the user to determine the meeting item is relevant to the user.

7. The method of claim 1, further comprising:
processing an audio recording of the meeting to generate respective audio clips relevant to the meeting items, wherein an audio clip of the audio clips comprises one or more utterances not included in the meeting item summary for the meeting item coterminous with the audio clip; and
determining, by the computing system, by applying a model of utterances to the one or more utterances in the audio clip, a corresponding relevance to the user of the meeting item summary for the meeting item coterminous with the audio clip.

8. The method of claim 7, wherein applying the model of utterances to the one or more utterances in the audio clip comprises determining, by the computing system, that a number of the one or more utterances in the audio clip exceeds a threshold.

9. The method of claim 1,
wherein applying the model of meeting item relevance comprises applying, by the computing system, the machine learning model to the meeting item summaries to determine learning model-based relevance to the user of each of the meeting item summaries,
wherein applying the model of meeting item relevance comprises applying, by the computing system, one or more rules that each specifies a relevance to the user of: (1) a type of meeting item summary, (2) content in meeting item summaries, or (3) a particular meeting item summary, to determine rules-based relevance to the user of each of the meeting item summaries, the method further comprising:
resolving, by the computing system, for each meeting item summary of the meeting item summaries, either (1) a contention between the learning model-based relevance to the user for the meeting item summary and the rules-based relevance to the user for the meeting item summary to determine the relevance to the user of the meeting item summary based at least on respective priorities of the learning model-based relevance to the user and the rules-based relevance to the user or (2) a multi-variate ensemble of adaptive weight regressed on both the learning model-based relevance to the user for the meeting item summary and the rules-based relevance to the user for the meeting item summary.

10. The method of claim 1, further comprising:
identifying a media item or meta information presented to any meeting participant during a particular meeting item; and
outputting, by the computing system, in response to determining the indication of relevance to the user for the meeting item summary for the meeting item indicates the meeting item summary is relevant to the user, the media item or meta information to the user.

11. The method of claim 1, further comprising:
determining, by the computing system, a corresponding salience score for the relevance to the user of each of the meeting item summaries; and
outputting the salience scores along with the respective indications of relevance to the user for the one or more of the meeting item summaries to provide the personalized summary of the meeting to the user.

12. The method of claim 1, further comprising:
processing, by the computing system, a meeting item of the meeting item summaries to generate an item for an external software program corresponding to the meeting item; and
outputting, by the computing system, the item to the external software program to create the item in the external software program.

13. The method of claim 1, further comprising:
receiving first one or more additional meeting item summaries in near real-time while a meeting is ongoing;
processing, by the computing system, respective indications of interest, from one or more users, in the first one or more additional meeting item summaries to adjust the machine learning model of meeting item relevance to progressively enhance the determination of relevance of meeting items during the course of the meeting;
determining, by the computing system, by applying the adjusted machine learning model of meeting item relevance to second one or more meeting item summaries received in near real-time while the meeting is ongoing, a corresponding relevance to a user of each of the second one or more meeting item summaries; and outputting, by the computing system, respective indications of relevance to the user for the second one or more meeting item summaries.

14. The method of claim 1,
wherein the user interface is a first user interface,
wherein outputting the respective indications of relevance to the user comprises outputting, for display at a display device, a second user interface comprising respective graphical elements for the plurality of meeting item summaries, and
wherein the respective indications of relevance to the user for the plurality of meeting item summaries comprise respective graphical indications of relevance associated with the respective graphical elements.

15. A computing system for automatically providing personalized summaries of meetings, the computing system comprising:
a memory configured to store information describing a meeting; and
processing circuitry configured to:
output, to a user interface, a list of one or more training meeting item summaries;
receive, at the user interface, a user action that is an indication of interest for a training meeting item summary of the training meeting item summaries;
process the training meeting item summaries to train a machine learning model of meeting item relevance to identify meeting item summaries relevant to a user, wherein the training meeting item summary of the training meeting item summaries has associated data indicating relevance of the training meeting item summary to a set of one or more users including the user, the associated data based on the indication of interest for the training meeting item summary of the training meeting item summaries;
receive a plurality of meeting item summaries of respective meeting items of the meeting;
determine, by applying a model of meeting item relevance to the meeting item summaries, a corresponding relevance to the user of each of the meeting item summaries, wherein the model of meeting item relevance comprises the machine learning model of meeting item relevance; and
output respective indications of relevance to the user for one or more of the meeting item summaries to provide a personalized summary of the meeting to the user.

16. The computing system of claim 15, wherein the processing circuitry is configured to:
apply the model of meeting item relevance by applying the machine learning model to the meeting item summaries to determine a corresponding relevance to the user of each of the meeting item summaries, wherein the machine learning model is trained to identify meeting item summaries relevant to the user.

17. The computing system of claim 15, wherein the processing circuitry is configured to:

apply the model of meeting item relevance by applying one or more rules that each specifies a relevance to the user of: (1) a type of meeting item summary, (2) content in meeting item summaries, or (3) a particular meeting item summary, to identify meeting item summaries relevant to the user.

18. The computing system of claim 15, wherein the processing circuitry is configured to apply the model of meeting item relevance by:
determining that a meeting item of the meeting items comprises at least one utterance by a particular meeting participant; and
determining utterances by the particular meeting participant are relevant to the user to determine the meeting item is relevant to the user.

19. The computing system of claim 15, wherein the processing circuitry is configured to:
determine a corresponding salience score for the relevance to the user of each of the meeting item summaries; and
output the salience scores along with the respective indications of relevance to the user for the one or more of the meeting item summaries to provide the personalized summary of the meeting to the user.

20. A non-transitory computer-readable medium comprising instructions for causing processing circuitry of a computing system to perform operations comprising:
outputting, to a user interface, a list of one or more training meeting item summaries;
receiving, at the user interface, a user action that is an indication of interest for a training meeting item summary of the training meeting item summaries;
processing the training meeting item summaries to train a machine learning model of meeting item relevance to identify meeting item summaries relevant to a user, wherein the training meeting item summary of the training meeting item summaries has associated data indicating relevance of the training meeting item summary to a set of one or more users including the user, the associated data based on the indication of interest for the training meeting item summary of the training meeting item summaries;
receiving a plurality of meeting item summaries of respective meeting items included a meeting;
determining, by applying a model of meeting item relevance to the meeting item summaries, a corresponding relevance to the user of each of the meeting item summaries, wherein the model of meeting item relevance comprises the machine learning model of meeting item relevance; and
outputting respective indications of relevance to the user for one or more of the meeting item summaries to provide a personalized summary of the meeting to the user.

* * * * *